US009062255B2

(12) United States Patent
DePouli (10) Patent No.: US 9,062,255 B2
(45) Date of Patent: Jun. 23, 2015

(54) BIOFUEL PYROLYSIS DEVICE AND METHODS OF USE THEREOF

(76) Inventor: Edward DePouli, Charlotte, NC (US)

( * ) Notice: Subject to any disclaimer, the term of this patent is extended or adjusted under 35 U.S.C. 154(b) by 586 days.

(21) Appl. No.: 13/410,759

(22) Filed: Mar. 2, 2012

(65) Prior Publication Data

US 2013/0228443 A1    Sep. 5, 2013

(51) Int. Cl.
| | |
|---|---|
| C10B 1/04 | (2006.01) |
| C10B 49/04 | (2006.01) |
| C10B 7/02 | (2006.01) |
| C10B 53/02 | (2006.01) |
| C10L 9/08 | (2006.01) |
| F26B 17/00 | (2006.01) |
| C10L 5/44 | (2006.01) |

(52) U.S. Cl.
CPC ... *C10B 7/02* (2013.01); *C10B 1/04* (2013.01); *C10B 49/04* (2013.01); *C10B 53/02* (2013.01); *C10L 9/083* (2013.01); *F26B 17/003* (2013.01); *Y02E 50/14* (2013.01); *Y02E 50/15* (2013.01); *C10L 5/442* (2013.01); *C10L 5/445* (2013.01); *F26B 17/005* (2013.01); *F26B 2200/02* (2013.01); *F26B 2210/16* (2013.01); *Y02E 50/10* (2013.01); *Y02E 50/30* (2013.01)

(58) Field of Classification Search
CPC .......... C10B 1/04; C10B 49/04; C10B 53/02; C10L 5/442; C10L 5/445; C10L 9/083; Y02E 50/10; Y02E 50/14; Y02E 50/15; Y02E 50/30
USPC .............. 201/16, 25, 34, 37; 202/96, 98, 100, 202/113, 116, 124, 151; 34/467, 476, 34/498–506, 109, 126, 135; 44/605, 606, 44/629; 110/218; 585/240
See application file for complete search history.

(56) References Cited

U.S. PATENT DOCUMENTS

| | | | | | |
|---|---|---|---|---|---|
| 3,972,801 | A | * | 8/1976 | Gregoli | 208/411 |
| 4,115,202 | A | * | 9/1978 | Lorenz et al. | 202/99 |
| 4,134,794 | A | * | 1/1979 | Lorenz et al. | 201/27 |
| 5,584,970 | A | * | 12/1996 | Schmalfeld et al. | 201/27 |
| 8,043,478 | B2 | * | 10/2011 | Merrell et al. | 202/105 |
| 8,161,663 | B2 | * | 4/2012 | Weisselberg et al. | 34/505 |
| 8,266,812 | B2 | * | 9/2012 | Weisselberg et al. | 34/77 |
| 8,266,821 | B2 | * | 9/2012 | Weisselberg et al. | 34/381 |
| 8,276,289 | B2 | * | 10/2012 | Causer | 34/90 |
| 8,322,056 | B2 | * | 12/2012 | Causer | 34/90 |
| 8,549,769 | B2 | * | 10/2013 | Weisselberg et al. | 34/417 |
| 2010/0242351 | A1 | * | 9/2010 | Causer | 44/505 |
| 2013/0055633 | A1 | * | 3/2013 | Causer | 44/605 |
| 2013/0075244 | A1 | * | 3/2013 | Eyer et al. | 201/29 |
| 2013/0318865 | A1 | * | 12/2013 | Weisselberg et al. | 44/606 |

* cited by examiner

*Primary Examiner* — Nina Bhat
*Assistant Examiner* — Jonathan Miller
(74) *Attorney, Agent, or Firm* — Oliff PLC (57) ABSTRACT

Described herein are biofuel pyrolysis devices and methods of use thereof. The devices described herein include a reactor having a plurality of chambers wherein the chambers of the reactor can be arranged to have at least one aerobic chamber and anaerobic chamber. In certain aspects, the devices described herein can be used for distilling biomass and for potentially generating torrefied products, which include, but are not limited to, torrefied biomass. In certain aspects, the method describe herein include, but are not limited to, introducing biomass onto at least one tray of a plurality of trays in a first chamber of the reactor, heating the biomass in the first chamber with heated vapor from at least one vapor inlet, and transferring the biomass from an upper tray to at least one of the following: a lower tray, a biomass outlet, another chamber (i.e., at least a second chamber), or any combination thereof.

18 Claims, 9 Drawing Sheets

PRIOR ART

BIOFUEL PYROLYSIS DEVICE AND METHODS OF USE THEREOF

BACKGROUND

Torrefaction (i.e., pyrolysis) is the thermochemical treatment of biomass that is typically carried out under atmospheric pressure in an anaerobic environment. During torrefaction, water and volatiles that are contained in the biomass are removed. Also during this process, biopolymers including cellulose, hemicellulose, and lignin partly decompose. The resulting product from torrefaction is a solid, dry, blackened material that is often referred to as "torrefied biomass," "torrefied biofuel," or "bio-coal". Torrefied products such as torrefied biomass have numerous industrial uses but are typically used as an alternative to fossil fuels because of their chemical properties (e.g., combustibility), low $SO_2$ emissions, and renewability. Also, legislative advantages exist for burning renewable fuels such as torrefied biofuels because these fuels count as zero when calculating $CO_2$ emissions. Thus, burning these renewable fuels are advantageous for at least these reasons.

Generally, biofuels can be divided into two classes, and these classes include first generation and second generation biofuels. First generation biofuels are derived from materials that can be used as food, and examples of first generation biofuels can include, but are not limited to, methanol produced from corn, diesel fuels produced from palm oil, and ethanol produced from either corn or sugar cane. However, unlike first generation biofuels, second generation biofuels are derived from materials that cannot be used as food by humans and/or livestock. Examples of second generation biofuels include, but are not limited to, cellulosic materials such as wood and grasses. In certain aspects, the biomass materials (e.g., woods and/or grasses) can first be first torrefied, and if desired, the biomass materials can be further distilled until little remains of the original material except for ash.

During the torrefaction process, biomass typically loses approximately 20% to 30% of its drymass, while only 10% of the energy content in the biomass is lost. This energy (e.g., in the form of volatiles) can be used as a heating fuel during the torrefaction process or it can be processed to recover the organic compounds. After the biomass is torrefied, it can be compacted and densified, usually into briquettes or pellets using conventional densification equipment. These processes further increase the density of the torrefied material and improve the torrefied material's hydrophobic properties. When densified, the final torrefied product repels water and thus can be stored in most places and conditions including moist air and rain.

Figure 1:
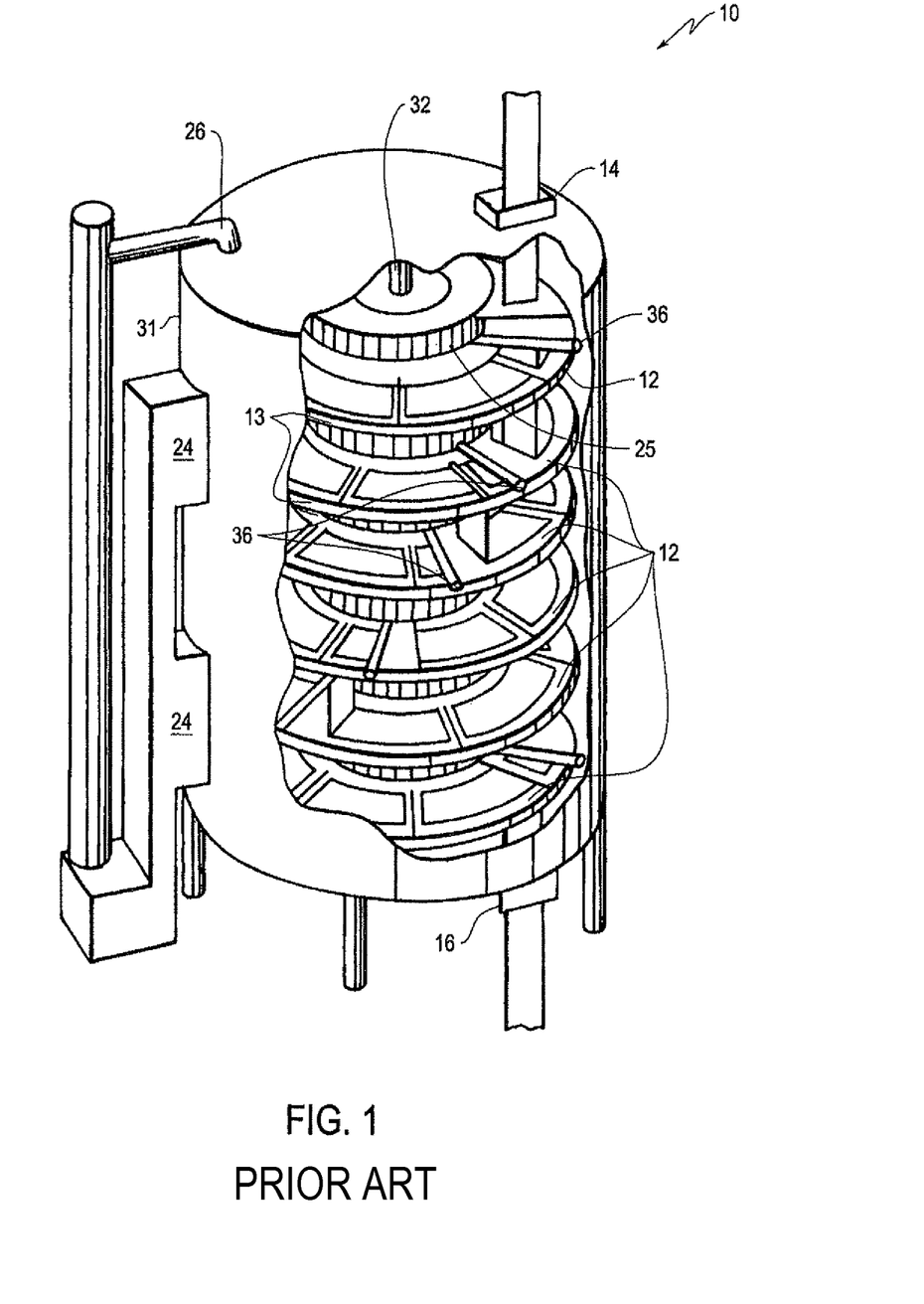
FIG. 1 shows a cut away view of a related art torrefaction device.
Figure 2:
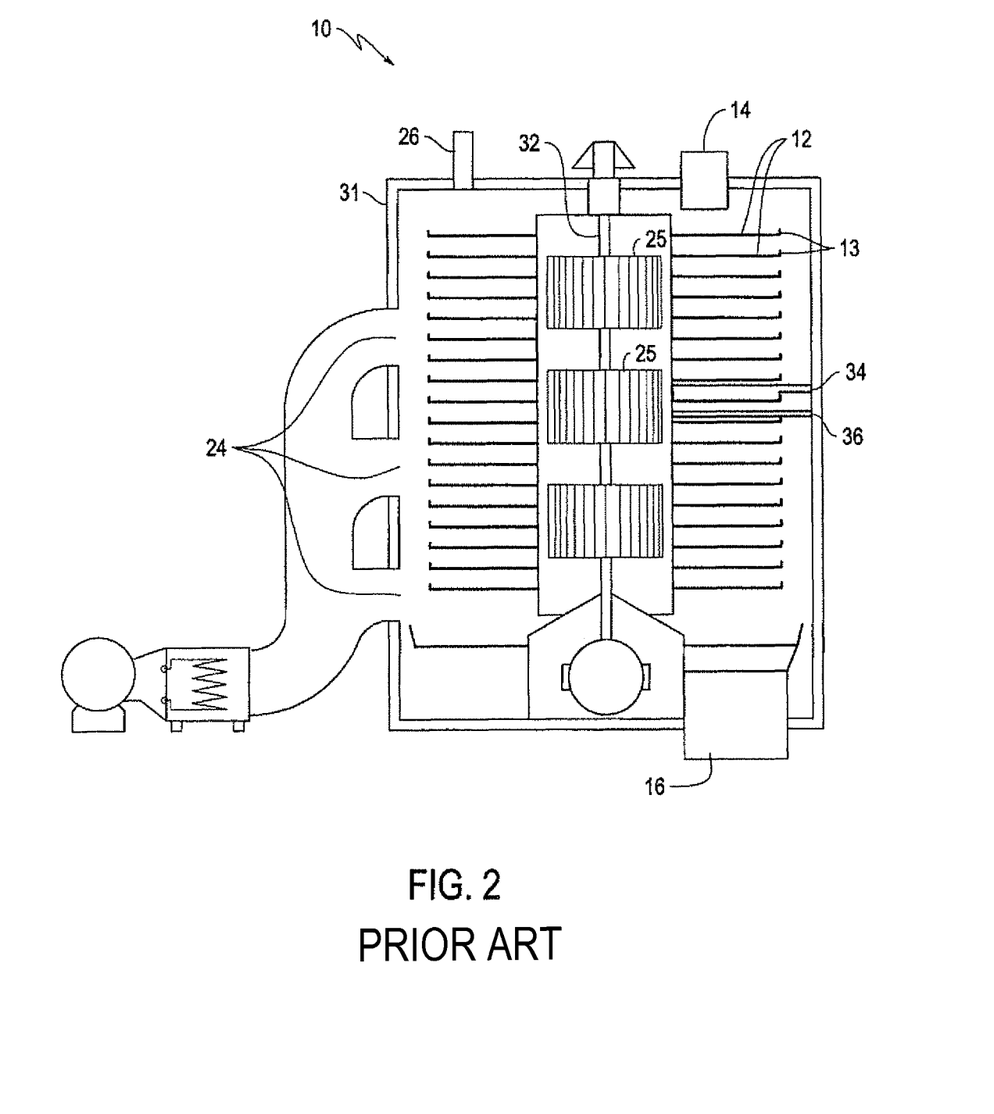
FIG. 2 shows a cross-sectional view of the related art torrefaction device
Figure 3:
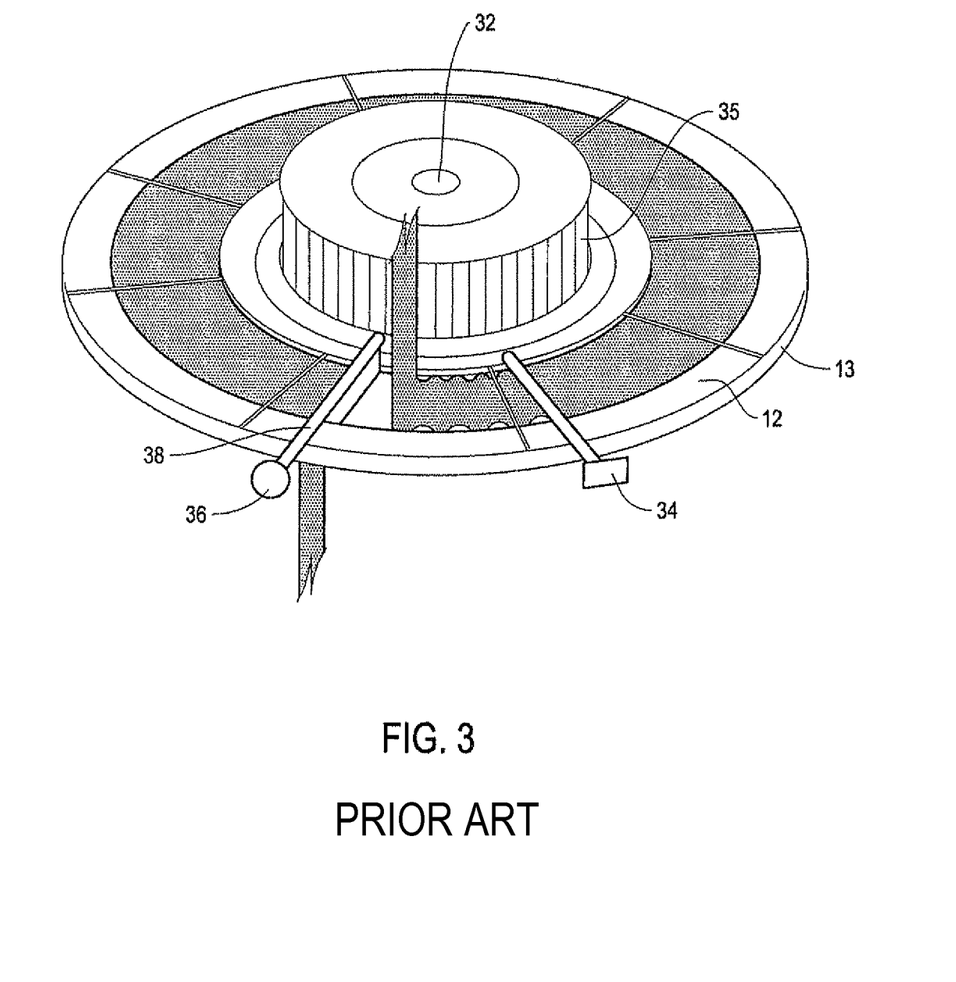
FIG. 3 shows an exemplary tray of the related art torrefaction device of FIGS. 1 and 2, which has a sweeper (36) and leveler (34).

To carry out torrefaction, numerous dryers have been designed, and examples of such dryers include, but are not limited to, Wyssmont's multi-hearth Turbo Dryer® and the Agri-Tech dryer. FIGS. 1, 2, and 3 show various perspectives of an exemplary, vertically arranged multi-hearth torrefaction dryer (10) and the components that it is comprised of. This device has a biomass inlet (14) and a biomass outlet (16) and a series of vertically arranged rotatable trays (12) with fixed sweepers (36) and height controllers (34) and a central air distribution fan (25). As the trays rotate the material (e.g., biomass), the material being dried or torrefied falls vertically through large gaps (e.g., approximately 4" to 6") or slots (38) in the trays onto another tray below. In addition, as shown in FIGS. 1 and 2, externally heated vapors enter the dryer through vapor inlets (24). These externally heated vapors aid in drying the solid materials being processed, and in specific instances, if high vapor temperatures are used, the solids can be torrefied. Furthermore, the device of FIGS. 1 and 2 have multiple, non-separated treatment zones created by the segmented nature of the center fans (25) connected to the center shaft (32). These center fans help create horizontal flow patterns. However, because the vapors and center fans create great turbulence inside the dryer, a large annular space as shown in FIG. 2 is required between the leading edge of the trays and the inner wall of the dryer. As indicated above, the material is transferred from an upper tray to a lower tray and is also dried and/or processed by the externally heated vapors. Eventually the final product is discharged through a biomass outlet (16), and the vapors can be discharged through the vapor outlet (26).

SUMMARY

Although, the dryer of FIGS. 1 and 2 is capable of producing torrefied products, numerous disadvantages exist because of its design. For example, its internal pressure is uniform throughout its device and cannot be differentially regulated. Also, its hot air inlets are not individually temperature controlled. As indicated above, a large annular space is required between the leading edge (13) of the trays and the inner wall of the dryer and large gaps exists in each of the trays, and these spaces and gaps allow air between two trays to freely mix in an uncontrollable manner. Thus, the dryer shown in FIGS. 1 and 2 clearly fails to create distinct, heating zones, and because distinct heating zones are not present, it is very difficult, if not impossible, to create large and precise temperature differences between various zones of the dryer of FIGS. 1 and 2. Each of the features discussed immediately above lead to inefficient and uncontrolled torrefaction.

Described herein are biofuel production devices and methods of use thereof. In certain aspects, the biofuel production devices include a reactor for distillation of biomass. The reactor for distillation of biomass has numerous components, which may include, for example, an environmental control unit and a plurality of chambers. The plurality of chambers can be arranged vertically along a vertical axis, and each chamber can independently include a shell, at least one biomass inlet, a plurality of trays arranged vertically along the vertical axis, a plurality of sweepers, at least one vapor inlet connected to the environmental control unit, the environmental control unit controlling temperature, internal vapor pressure, vapor composition and vapor flow within a first chamber, independently of temperature, internal vapor pressure and vapor flow of any other chamber of the reactor, at least one vapor outlet for transferring vapor out of the chamber, at least one biomass valve that separates the first chamber from a second chamber, the biomass valve reduces or inhibits vapor transfer from the first chamber to the second chamber and creates a temperature controlled, pressure controlled, and vapor controlled environment inside the first chamber relative to a second chamber. In certain aspects, the internal environment of each chamber can independently have either positive or negative pressure.

Further described herein are methods of use of the biocoal production devices and methods of distilling biomass by operating the biocoal production devices. In certain aspects, the devices described herein can be used for methods of distilling biomass in a reactor. The reactor includes, for example, a plurality of chambers, and in each chamber, temperature, internal vapor pressure, vapor composition and vapor flow can be independently controlled. The methods described herein can include introducing biomass onto at least one tray of a plurality of trays in a first chamber of the reactor, heating the biomass in the first chamber with heated vapor from at least one vapor inlet, and transferring the biomass from an upper tray to at least one of the following: a lower tray, a biomass valve, a biomass outlet, another chamber, or any combination thereof. In certain aspects, vapor from any chamber can be used in another chamber if desired.

DETAILED DESCRIPTION OF EMBODIMENTS

Figure 4:
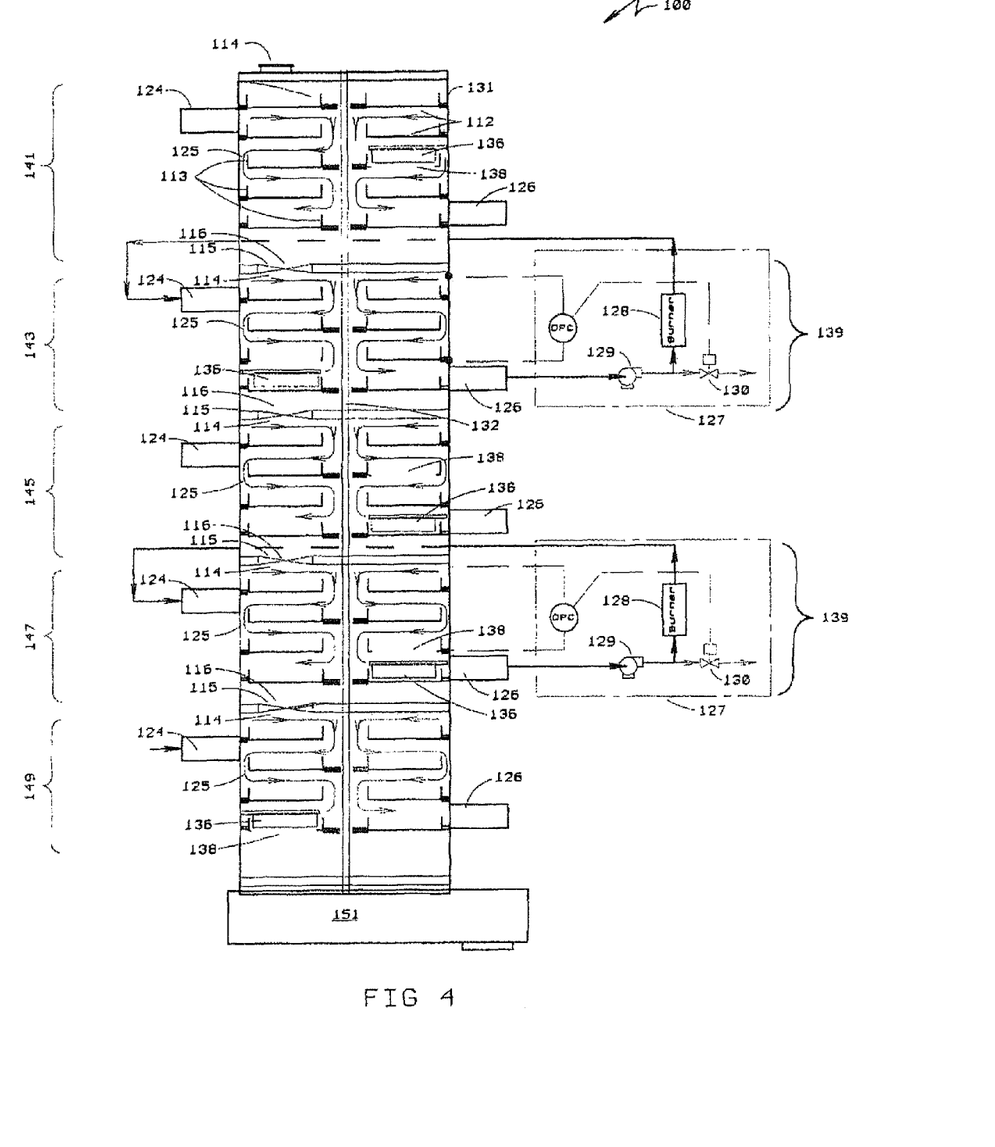
FIG. 4 shows a cross sectional view of an exemplary reactor as described herein.
Figure 6:
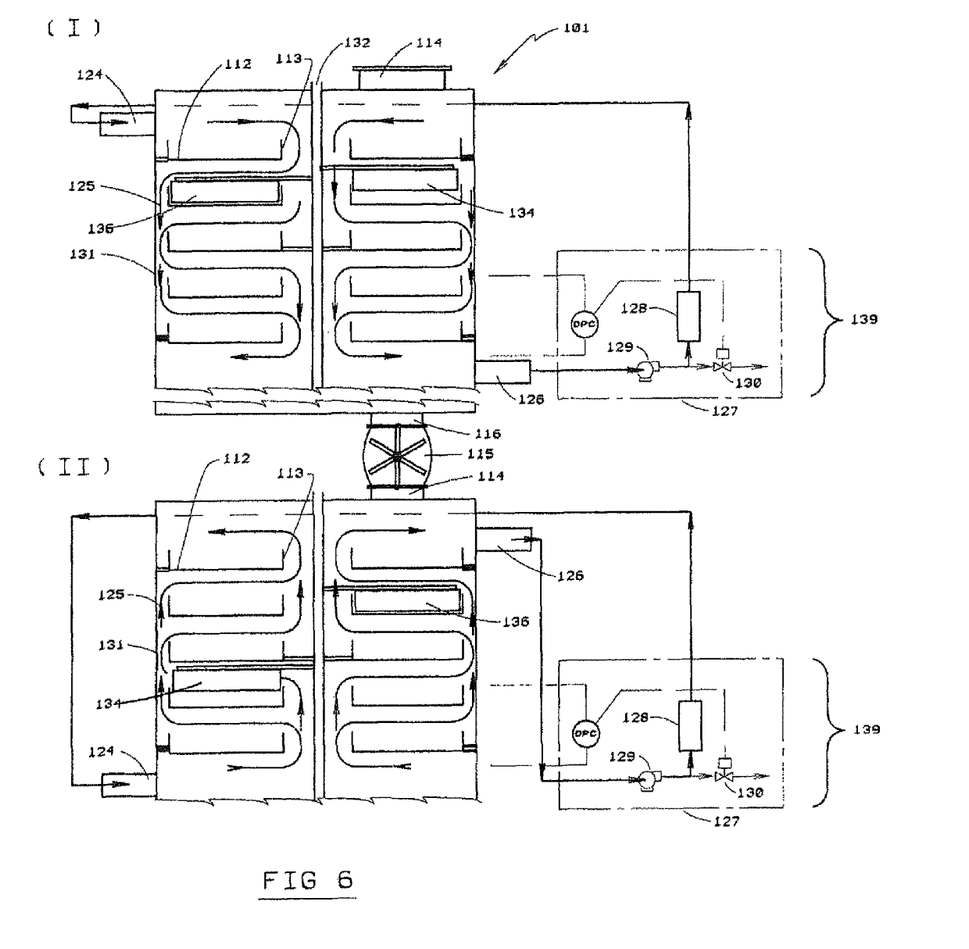
FIG. 6 shows a schematic for displaying placement of biomass into the exemplary reactor and illustrative vapor flow occurring within the exemplary reactor.

The reactor described herein is used for efficiently drying biomass, torrifying biomass, distilling biomass, or any combination thereof. In certain aspects, as shown in FIG. 4, the reactor (100) includes a plurality of chambers arranged along a vertical axis. FIG. 6 shows an exemplary embodiment of a chamber (101). Each chamber independently has an outer shell (131), a vapor inlet (124), a vapor outlet (126), and a plurality of trays (112) housed within the chamber, and each chamber has at least one biomass inlet (114) and at least one biomass outlet (116). The vapor outlet and vapor inlet of each chamber are either independently connected to or mounted on the outer shell, and in certain aspects, each chamber can be connected to an environmental control unit (139). In certain aspects, there are a plurality of environmental control units and each chamber is connected to an individual environmental control unit. For example, if there are five chambers in a reactor, there can be five different environmental control units and each chamber can be connected to a single, independent environmental control unit. In certain aspects, the vapor inlet (124) allows for heated vapor to enter the chamber and the vapor outlet (126) allows for the heated vapor to exit the chamber.

Figure 5A:
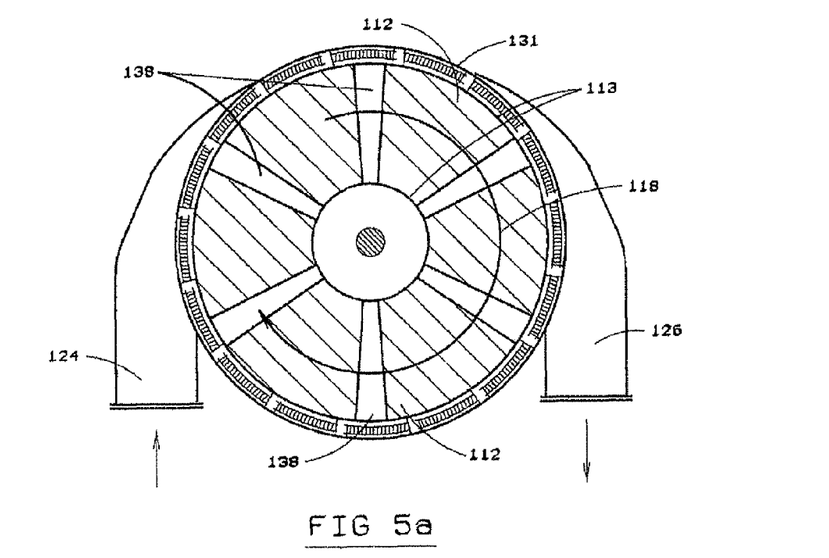
FIG. 5(a) shows a top view (i.e., a plan view) of an exemplary tray of the reactor connected to an inlet and outlet of the reactor.
Figure 5B:
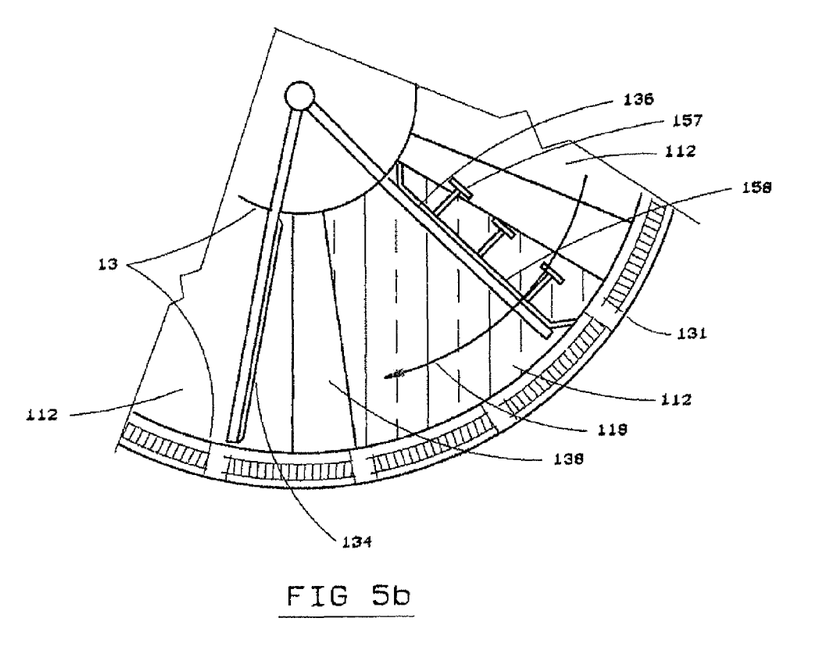
FIG. 5(b) shows an exploded view of a top view a plan view) of an exemplary tray.

As shown in FIGS. 5 and 6, when the heated vapor enters the chamber, vapor flow (125) having a cyclonic motion (i.e., a circular motion rotating about a vertical axis) can be created. In certain aspects, the cyclonic motion can be either co-current or counter-current relative to the transfer of the biomass in the chamber. For example, when the cyclonic motion is co-current with the transfer of biomass, the cyclonic motion begins for example at a first tray (112) and follows a descending torturous or serpentine path winding in and around the plurality of trays immediately below the first tray in the chamber. For example, FIG. 6 shows examples of how vapor can enter an internal space of the chamber (101) via an inlet (124). In this figure, the vapor passes in a horizontal manner or about a horizontal axis about a first tray (113). Subsequently, the vapor descends in a torturous or serpentine path to the plurality of trays immediately below the first tray and the heated vapor subsequently exits the chamber via the vapor outlet (126). In certain aspects and when it is desired, vapor flow can be reversed, creating countercurrent flow relative to the biomass, and the vapor outlet (126) will become a vapor inlet and the vapor inlet (124) will become a vapor outlet (not shown). If vapor flow is reversed and is countercurrent, the cyclonic motion will ascend from a lower most tray in the chamber to an upper most tray in the chamber in a circular motion rotating about a vertical axis while the biomass is transferred from tray to tray in a descending manner. For example, (I) of FIG. 6 demonstrates a chamber having a cyclonic motion that is flowing co-current relative to the transfer of biomass, and (II) of FIG. 6 demonstrates a chamber having a cyclonic motion flowing counter-current relative to the transfer of biomass.

In certain aspects, each chamber is a closed system, which has a controlled environment (e.g., controlled temperature, pressure, aerobic environment, anaerobic environment) and allows for introduction of specific components including but not limited to biomass and vapor into the chamber. In this aspect, the closed system allows for introduction of heated vapor, pressure, etc., but doesn't not allow for the inadvertant introduction of ambient air. The environmental control unit (139) can independently control temperature, pressure, amount of heated vapor (e.g., volume, flow rate, etc.), the cyclonic motion (i.e., either co-current or counter-current to relative to the flow of biomass), etc. within a chamber independently of the conditions (i.e., temperature, pressure, amount of heated vapor, etc.) occurring in another chamber. In certain aspects, the environmental control unit includes a vapor control unit (127), a burner (128), a pump (129), and a valve (130), and the environmental control unit is connected to the vapor inlet (124), vapor outlet (126), or a combination thereof of each chamber.

The heated vapor described above can include numerous different temperature ranges such as 100° F. to 700° F., 150° F. to 650° F., 200° F. to 600° F., 250° F. to 550° F., 300° F. to 500° F., 350° F. to 450° F., and 375° F. to 425° F. As shown in FIG. 4, each chamber is independently equipped with a vapor inlet (124), and in certain aspects, each chamber is independently equipped with an environmental control unit. As described above, the vapor inlet is connected to an environmental control unit which includes at least a burner (128) and pump (129). The burner is used to heat and/or super heat a material in a chamber by generating heated vapor and pumping the heated vapor through the vapor inlet (124) into the chamber. Because each chamber is independently equipped with a vapor inlet, heated vapors of various temperature ranges can be independently introduced into each chamber to control the temperature within each chamber.

Furthermore, as shown within FIG. 6, there are a plurality of trays (112) arranged along a vertical axis in each chamber. In certain aspects, each tray can have vertical rims (113) along the periphery of the tray, and these rims aid in containing or holding the biomass in the tray. The plurality of trays can be arranged in multiple ways along a vertical axis and can have multiple shapes and/or conformations. For example, the trays can be arranged horizontally (i.e., perpendicular to the vertical axis of the reactor and the center shaft (132)). The trays can further be independently rotatable, non-rotatable, or any combination thereof about the vertical axis. In certain embodiments, each tray in the chamber is rotatable. In other embodiments, each tray in the chamber is non-rotatable. While in further embodiments, there can be a mixture of non-rotatable and rotatable trays in the chamber. In certain aspects, sweepers (136), height adjusters (134), or a combination thereof are present in the chamber.

In certain aspects, sweepers (136) help to transfer biomass from tray to tray (e.g., an upper tray to a lower tray) and ultimately from chamber to chamber. The sweepers and height adjusters can be mounted in such a way that the sweepers and height adjusters are perpendicular to the trays. In certain instances, the sweepers are mounted to an inner wall of the chamber if the trays are rotatable, and in certain aspects, the sweepers are mounted to the center shaft if the trays are stationary (i.e., non-rotatable). In certain aspects, the sweepers can contact the trays (112) and/or contact biomass on the tray and move the biomass from one tray to another tray. For example, a chamber can contain a plurality of non-rotatable trays. When a tray is non-rotatable, at least one sweeper is used. When biomass is present on a tray (112), the sweeper is capable of moving (e.g., sweeping the biomass) the biomass circumferentially about the tray towards the slot (138). Upon contacting the slot, the biomass falls to the tray immediately below and the same process can occur within this tray. (The transfer and/or movement of biomass from tray to tray as described immediately above may occur in substantially the same manner as shown in FIG. 3.) FIGS. 5(a) and 5(b) illustrate certain aspects of the chambers described herein. For example, FIG. 5(a) shows a plan view (i.e., a top view) of a tray (112) capable of rotating about a vertical axis (118). For example, in FIG. 5(a) the tray is capable of rotating in a clockwise manner; however, one of ordinary skill in the art would recognize that the tray can be configured to rotate in any manner desired (e.g., a counter-clockwise direction). FIG. 5(a) further shows gaps or slots (138) in the tray, which biomass can be moved towards, and the biomass can transferred via the slots to another tray below. FIG. 5(b) shows an exploded view of FIG. 5(a). However, FIG. 5(b) additionally shows a sweeper (136) and height adjuster (134) being attached to the center shaft, which are not shown in FIG. 5(a). In this example, the sweeper and height adjusters can be stationary/non-rotatable since the tray (112) is rotatable in a clockwise manner. As shown, when biomass is present on the tray of FIG. 5(b), the tray rotates towards at least the sweeper (136). As shown in FIG. 5(b), in certain aspects, the sweeper can have a plurality of leading plows (157) and at least one lagging plow (158). The sweeper of FIG. 5(b) is configured to have segmented portions formed by gaps occurring in between the plurality of leading plows. When contacting the biomass, a leading plow moves or transfers a partial portion of the biomass present on a tray about the tray and eventually to a gap or slot in the tray. Thus, the leading plow facilitates at least partial transfer of the biomass present on a tray. However, at least a partial portion of the biomass is not contacted or transferred about the tray by the leading plow. The portion that was not contacted and/or transferred by the leading plow is subsequently contacted by the lagging plow. The lagging plow can act to move or transfer this biomass about the tray and eventually to a gap, and this lagging plow can further act to level the biomass if desired. Use of the sweeper having a plurality of leading plows (147) and a lagging plow (148) has several advantages which includes, but are not limited to, increasing the amount of time that biomass can fall through the slot and increasing the overall amount of biomass that may be placed and/or transferred onto a tray at any given time.

It is also to be understood that in certain aspects the trays, sweepers can have an opposite arrangement from that describe above. For example, a chamber may contain a plurality of rotatable trays. When a tray is rotatable, it is understood that a sweeper may be present in the chamber, and if a sweeper is present, at least the sweeper can be non-rotatable (i.e., stationarily mounted or connected to the center shaft (132) in a non-rotatable manner). In this example, the plurality of rotatable trays each have a slot (138). When biomass is present on a tray, the rotatable tray is capable of rotating about a vertical axis and the sweeper is capable of moving (i.e., sweeping the biomass) the biomass circumferentially about the tray towards the slot. This series of movements can continue until the biomass falls onto another tray, until the biomass falls onto a chamber separator, into another chamber, or any combination thereof. In certain aspects, the chamber separator can include a baffle, a biomass valve (115) that can include but is not limited to a rotary valve or a double dump valve, or any combination thereof. If the biomass falls onto the chamber separator, the biomass will fall to the next chamber once the separator is opened and/or allows for the introduction of the biomass to the chamber's outlet.

Figure 7:
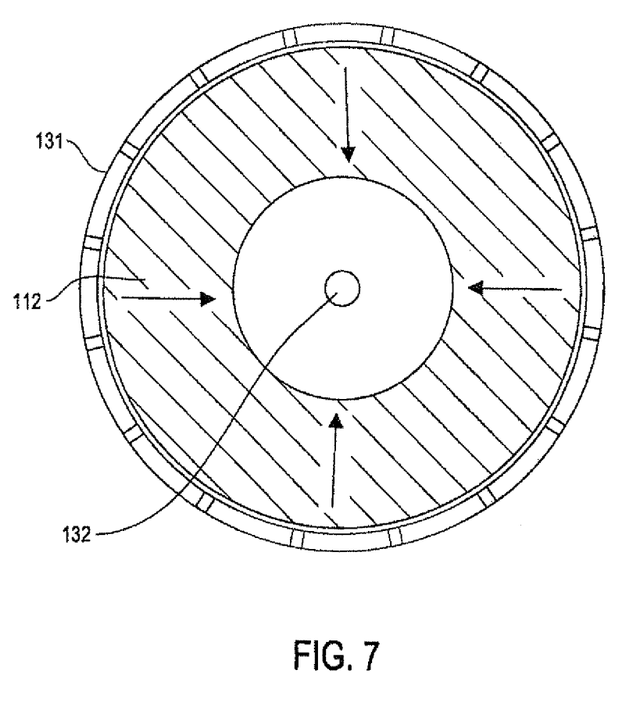
FIG. 7 shows a top view of an exemplary annular tray of the reactor.
Figure 8:
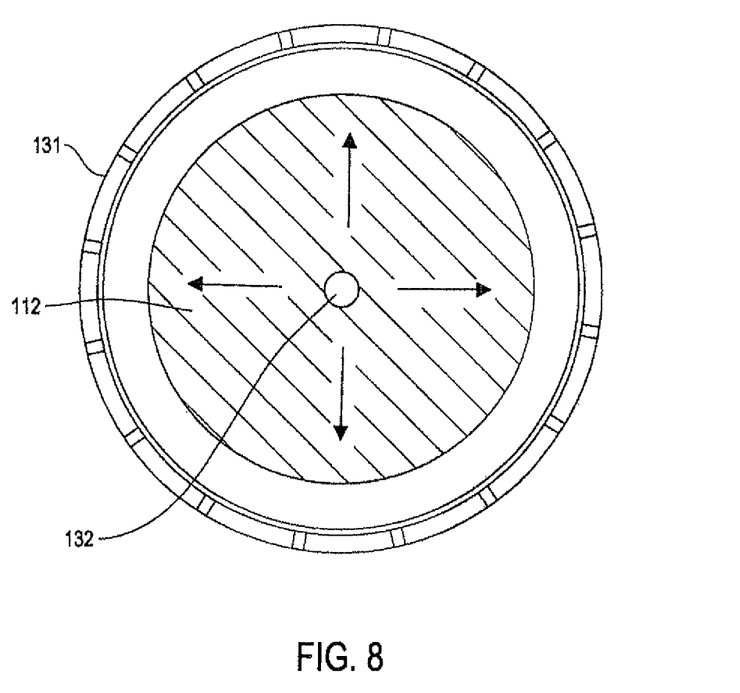
FIG. 8 shows a top view of an exemplary tray of the reactor.

In yet another example, it is to be understood that the trays can have alternative conformations from the conformations (i.e., arrangements) described above. For example, FIGS. 7 and 8 display two separate tray conformations. As shown in FIG. 7, the tray (112) can have an annular shape. When the tray has an annular shape, it has a hole in the middle of tray (i.e., dough-nut shaped) in which biomass can be passed through. In certain aspects, the annular shaped tray can be connected to or mounted on either the center shaft (132) or the inner wall of the reactor by brackets, fasteners, or a combination thereof (not shown), and in this aspect, the annular shaped tray can either be rotatable or non-rotatable. As shown in FIG. 8, the tray (112) can further have a circular shape, and the circular shaped tray may have a circumference, diameter, or a combination thereof that is equal to or larger than the hole in the middle of the annular shaped tray (i.e., the circumference or diameter of the annular shaped trays hole). In certain aspects the circular shaped tray can be connected to or mounted on the center shaft (132) by, for example, brackets or fasteners, and in yet a further aspect, the circular tray can be either rotatable or non-rotatable (i.e., capable of rotating about the vertical axis), and in certain aspects, unlike the annular shaped tray, the circular tray does not have a hole in the middle for passing biomass through.

Figure 9:
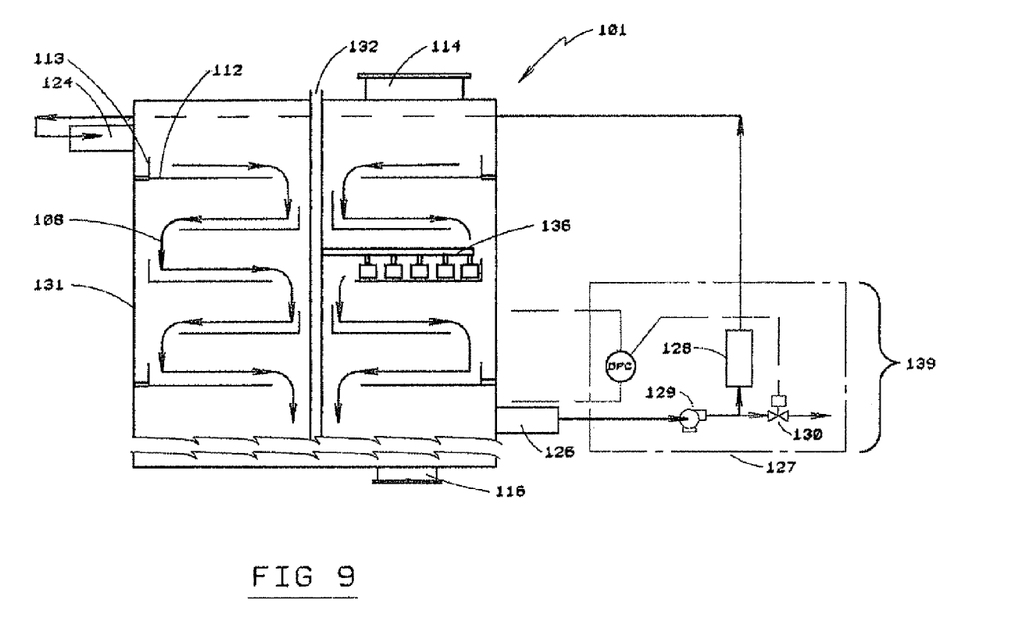
FIG. 9 shows a chamber including the exemplary trays of FIGS. 7 and 8.

In certain aspects, the chambers described above can have a plurality of alternating annular shaped and circular shaped trays. For example, FIG. 9 shows a chamber having alternating annular shaped and circular shaped trays in which at least one sweeper (136) is present and is configured to move the biomass in a radial direction relative to the tray. When a chamber is arranged as shown in FIG. 9, the annular shaped trays and the circular shaped trays can be independently rotatable, non-rotatable or a combination thereof. For simplicity, only one example of a chamber having annular and circular shaped trays will be described. However, it is to be understood that this is a non-limiting example in which numerous other combinations and embodiments can be envisioned. In this example, the chamber includes at least two annular shaped trays and at least one circular shaped tray (or if desired, a vice versa arrangement can be used, i.e. at least two circular shaped trays and at least one annular shaped tray), wherein the trays are arranged as follows: a first annular shaped tray, at least a first circular shaped tray, and a second annular tray.

When annular shaped and circular shaped trays are present in a chamber, sweepers (136) may also be present and configured to transfer biomass from tray to tray and ultimately from chamber to chamber. For example, FIG. 9, which has at least one sweeper (136) and is arranged as described immediately above, demonstrates these features. In certain aspects, the sweepers can be mounted to or connected to the center shaft (132) in such a way that the sweepers either contact the trays or contact the biomass on the trays and facilitate movement of the biomass from an upper tray to a lower tray. In certain instances, the sweepers are angled or bent in such a way that biomass is moved in radial direction (as indicated by the arrows in FIGS. 7 and 8) on the tray and ultimately falls to at least one tray arranged beneath the tray which the biomass was previously on. In certain instances, the sweepers are capable of actuating movements that move the biomass radially from the periphery of the annular shaped tray (FIG. 7) to the hole in the middle of the annular shaped tray. Once the biomass reaches the hole of the annular shaped tray, the biomass falls onto, for example, a circular shaped tray (FIG. 8) arranged below the annularly shaped tray. In certain instances, the sweepers are capable of actuating movements that move the biomass radially on the circular shaped tray to the periphery of the circular shaped tray. Once the biomass reaches the periphery of the circular shaped tray, the biomass falls onto, for example an annular shaped tray below the circular shaped tray. This series of alternating trays and/or movements can continue until the biomass falls into another chamber or until the biomass falls onto the biomass valve (115). If the biomass falls onto the biomass valve, the biomass will fall through a biomass outlet (116) to the next chamber once the biomass valve (115) is opened.

It is also to be understood that the trays and sweepers can have the opposite arrangement from that describe above. For example, a chamber may contain a plurality of alternating rotatable annular shaped and circular shaped trays (e.g., the trays of FIGS. 7 and 8). When these trays are rotatable, it is understood that a sweeper may be present in the chamber, and if a sweeper is present at least the sweeper is non-rotatable (i.e., mounted or connected to the center shaft (132) in a non-rotatable manner). In this example, the plurality of alternating rotatable annular shaped and circular shaped trays are capable of rotating about a vertical axis and the sweeper is capable moving (i.e., sweeping the biomass) the biomass radially about the trays to facilitate movement of biomass from one tray to another tray (e.g., from one annular shaped tray to a circular shaped tray and vice versa).

As indicated above and as further shown in FIG. 4, a plurality of chambers can be arranged along a vertical axis to form the reactor (100) described herein. Each chamber of the reactor can have any of the arrangements, conformations, and functions described immediately above. In certain aspects, the reactor has a plurality of chambers that includes at least one chamber, at least two chambers, at least three chambers, at least four chambers, at least five chambers, or at least six chambers arranged along a vertical axis. When at least two or more chambers (e.g., 5 chambers as shown in FIG. 4) are arranged along a vertical axis to form the reactor, the chambers can be individually fastened to one another using fasteners, which include, but are not limited to, screws, nuts and bolts, washers, pins, rivets, etc.

As shown in FIGS. 4 and 6, when a plurality of chambers (e.g., 141, 143, 145, 147, and 149 of FIG. 4) are used to form a reactor, each individual chamber can be further separated by a chamber separator, which includes, but is not limited to, a baffle or a biomass valve (115). Furthermore, when present and in the closed position, the separator (e.g., biomass valves (115)) seal the biomass outlet (116) to separate each individual chamber of the reactor and to prevent fluid communication between the chambers. This feature further helps to generate specific conditions (i.e., different temperature conditions, different pressure conditions, varying degrees of aerobic and anaerobic conditions) in one chamber that differs from specific conditions in a separate chamber. However, in certain instances, when the chamber separator can be opened and allows for fluid communication between two chambers (e.g., for a sufficient time to transfer biomass between chambers). In another aspect, the chamber separator allows for the transfer of biomass between two chambers, but fluid communication does not necessarily occur. For example, FIG. 6 further demonstrates the chamber separator described herein. FIG. 6 shows an exploded view of two chambers wherein a first chamber (I) is connected to a second chamber (II). More specifically, the biomass outlet (116) of the first chamber (1) is connected to a biomass inlet (114) of the second chamber. In this example (i.e., FIG. 6) a biomass valve (115) (e.g., a rotary valve) is present, which allows for biomass to be transferred from the first chamber to the second chamber with either no or minimal loss of environmental conditions in either chamber As alluded to above and as further shown in FIG. 4, in certain aspects, at least 5 chambers can be arranged along a vertical axis to form a reactor (100). Each of these chambers can have any of the features described above. For example, each chamber can have a plurality of trays (112), a vapor inlet (124), a vapor outlet (126), etc. In certain aspects, it is desirable that each chamber have specific conditions (e.g., temperature, internal vapor pressure, aerobic or anaerobic conditions) that vary from the four other chambers. For example, as shown in FIG. 4, the chambers of reactor (100) can include a first chamber that is an aerobic chamber (141), a second chamber that is a first anaerobic chamber (143), a third chamber that is a second anaerobic chamber (145), a fourth chamber that is a third anaerobic chamber (147), a fifth chamber that is a fourth anaerobic chamber (149), and a cool down compartment (151). In this example, each chamber can be separated by the biomass valves (115) described above and each chamber can have different specific conditions as discussed above.

In this example, thermal degradation (i.e., decomposition) of the biomass can occur. For example, at temperatures higher temperatures, several pyrolytic reactions begin to occur. These reactions can be grouped into three basic classifications: the first group occurs at lower temperatures and can generally be defined as thermo-oxidative and/or hydrolytic At higher temperatures, water is lost, first from the water absorbed by cellulose and then by beta-elimination from the cellulose hydroxyls. At still higher temperatures, several competing pyrolytic reactions being to occur. For example, hemi-cellulose decomposition, cellulose decomposition, and lignin decomposition begins to occur in a temperature dependent manner.

In this example, biomass, which includes but is not limited to wood, grasses, or other cellulosic material, is first placed into the aerobic chamber (141) of the reactor via a biomass inlet (114) and preferably onto at least one tray inside the aerobic chamber. These biomass materials initially contain between 0% to 70% moisture depending on what kind of biomass is selected. For example, if wood chips are used and have not been pre-dried, between about 45% and about 70% moisture will be in the wood chips depending on the species of wood/tree selected. However, if grass is selected as biomass, only about 10% moisture is initially present in this biomass material.

After placing the biomass material in the aerobic chamber (141), heated aerobic vapor is provided to the aerobic chamber via the vapor inlet (124) to heat and drive off the moisture contained within the biomass material. In this example, moisture in the form of water is primarily driven off, and in certain aspects, no volatiles will be recovered during this step. As indicated above, the environmental control unit (131) controls the chamber's environment and provides heated aerobic vapor via the burner (128). This heated aerobic vapor is pumped to the vapor inlet (124) of the aerobic chamber (141) via the pump (129) and into the aerobic chamber (141) of the reactor. In this example, the heated aerobic vapor can range from about 200° F. to about 400° F., and in preferred embodiments, the heated air can range from about 275° F. to about 350° F. In certain aspects, the heated aerobic vapor of the aerobic chamber can be about 200° F., about 225° F., about 250° F., about 275° F., about 300° F., about 325° F., about 350° F., about 400° F., or any range thereof where the endpoints are selected from the immediately preceding list. Drying time can be varied depending on the moisture content of the biomass and the temperature used for drying. Lower temperatures take longer to dry the biomass but minimize emissions thus limiting the need for pollution control. Generally, drying time can be adjusted as desired. As described above, the heated aerobic heated vapor moves in the aerobic chamber in a cyclonic manner to dry the biomass material. The biomass is heated in the aerobic chamber (i.e., a chamber having an aerobic environment) for a sufficient time and at a specific temperature to reduce the biomass's overall moisture content to 5% or lower without burning off lower molecular weight volatile organic compounds present in the biomass. In certain aspects, the moisture can be removed from the chamber and recovered by, for example, a condensation and distillation process or it can be discharged directly into the atmosphere.

In this example, after drying the biomass for a sufficient time and at a sufficient temperature, the dried biomass from the aerobic chamber (141) is transferred to the first anaerobic chamber (143) by the transfer process described above and by, for example, opening the biomass valve (115) in the aerobic chamber. In certain aspects, the aerobic chamber's biomass valve is then closed after transferring a desired amount of biomass from the aerobic chamber to the first anaerobic chamber. Either before, during, or after receiving the dried biomass from the aerobic chamber, the first anaerobic chamber is heated to a temperature ranging from about 350° F. to about 450° F., and in preferred embodiments the first anaerobic chamber is heated from about 385° F. to about 415° F. In certain aspects, the first anaerobic chamber is heated to a temperature of about 350° F., about 360° F., about 370° F., about 380° F., about 390° F., about 400° F., about 410° F., about 420° F., about 430° F., about 440° F., about 450° F., or any range thereof where the endpoints are selected from the immediately preceding list. In certain aspects, the first anaerobic chamber is heated by heated anaerobic vapor.

In the first anaerobic chamber (143) and at the temperatures described immediately above, lower molecular weight molecules present in the dried biomass, which include but are not limited to methanol, acetic acid, and methyl acetate, are vaporized and driven off, while higher molecular weight molecules (e.g., tars) remain in the biomass. In certain aspects, the lower molecular weight molecules can be removed from the chamber and recovered, for example, by a condensation and distillation process. Since moisture in the form of water was previously driven off in the aerobic chamber, the volatiles driven off and recovered during this stage may be more easily recovered and are of commercial value.

In this example, the biomass from the first anaerobic chamber (143) can be transferred to the second anaerobic chamber (145) by the previously described transfer process and by, for example, opening the biomass valve (115) in the first anaerobic chamber that separates the first anaerobic chamber from the second anaerobic chamber. In certain aspects, the biomass valve that separates the first biomass chamber from the second biomass chamber is then closed after transferring a desired amount of biomass from the first anaerobic chamber to the second anaerobic chamber. Either before, during, or after receiving the biomass from the first anaerobic chamber, the second anaerobic chamber is heated to a temperature ranging from about 420° F. to about 510° F., and in preferred embodiments the second anaerobic chamber is heated from about 460° F. to about 500° F. In certain aspects, the second anaerobic chamber is heated to a temperature of about 420° F., about 430° F., about 440° F., about 450° F., about 460° F., about 470° F., about 480° F., about 490° F., about 500° F., about 510° F., or any range thereof where the endpoints are selected from the immediately preceding list. In certain aspects, the second anaerobic chamber is heated by heated anaerobic vapor.

In the second anaerobic chamber and at the temperatures described immediately above, hemi-cellulose begins to decompose and higher molecular weight molecules present in the dried biomass are driven off. In certain aspects, the high molecular weight molecules driven off during this stage can be removed from the chamber and recovered by a condensation and distillation process. The volatiles driven off and recovered during this stage may be more easily recovered because water was previously driven off while the biomass was in the aerobic chamber. In certain aspects, the biomass can be heated in the second anaerobic chamber at a sufficient temperature and pressure to induce hemi-cellulose decomposition occurring at a higher rate than either cellulose or lignin decomposition in the biomass while limiting the amount of lignin decomposition, In this example, the biomass from the second anaerobic chamber (145) can be transferred to the third anaerobic chamber (147) by the previously described transfer process and by opening the biomass valve that separates the second anaerobic chamber from the third anaerobic chamber. In certain aspects, the biomass valve that separates the second biomass chamber from the third biomass chamber is then closed after transferring a desired amount of biomass from the second anaerobic chamber to the third anaerobic chamber. Either before, during, or after receiving the biomass from the second anaerobic chamber, the third anaerobic chamber is heated to a temperature ranging from about 490° F. to about 560° F., and in preferred embodiments the first anaerobic chamber is heated from about 500° F. to about 540° F. In certain aspects, the third anaerobic chamber is heated to a temperature of about 490° F., about 500° F., about 510° F., about 520° F., about 530° F., about 540° F., or any range thereof where the endpoints are selected from the immediately preceding list.

In the third anaerobic chamber and at the temperatures described immediately above, cellulose begins to decompose. In certain aspects, the biomass can be heated in the third anaerobic chamber at a sufficient temperature and pressure to induce cellulose decomposition occurring at a higher rate than either hemi-cellulose and/or lignin decomposition in the biomass, while limiting the amount of lignin decomposition.

In this example, the biomass from the third anaerobic chamber (147) can be transferred to the fourth anaerobic chamber (149) by the transfer process described above and by opening the biomass valve that separates the third anaerobic chamber from the fourth anaerobic chamber. In certain aspects, the biomass valve that separates the third biomass chamber from the fourth biomass chamber is then closed after transferring a desired amount of biomass from the third anaerobic chamber to the fourth anaerobic chamber. Either before, during, or after receiving the biomass from the third anaerobic chamber, the fourth anaerobic chamber is heated to a temperature ranging from about 540° F. to about 620° F., and in preferred embodiments the fourth anaerobic chamber is heated from about 560° F. to about 600° F. In certain aspects, the fourth anaerobic chamber is heated to a temperature of about 540° F., about 550° F., about 560° F., about 570° F., about 580° F., about 590° F., 600° F., 610° F., 620° F., or any range thereof where the endpoints are selected from the immediately preceding list.

In the fourth anaerobic chamber and at the temperatures described immediately above, lignin begins to decompose. In certain aspects the biomass can be heated in the fourth anaerobic chamber at a sufficient temperature and pressure to induce minimal lignin decomposition while hemi-cellulose or cellulose decomposition occurs.

Based on the desired final calorific content of the end product and/or the desired end use for the torrefied material (e.g., biocoal, synthetic wood, second generation biofuels, etc.), the exact temperatures, pressures, and internal atmosphere of the first, second, third, and fourth anaerobic chambers can be controlled accordingly. For example, in certain aspects, at least the first, second, third, and fourth anaerobic chambers are operated at a negative pressure, a positive pressure, or a combination thereof. When a chamber is operated at negative pressure (i.e., lower than atmospheric pressure), removal of selected organic decomposition products can be improved. In certain aspects, the chamber is operated at internal pressures above atmospheric pressure (i.e., positive pressure) so that an anaerobic environment is created and any leakage that may occur within these chambers leaks outwardly. To clarify, because internal pressure within the first, second, third, and fourth anaerobic chambers is higher than ambient, room pressure, if any leaks exist in any of the anaerobic chambers, ambient, room pressure and/or ambient air cannot leak into the chambers. Thus, even if leaks are present in any of the anaerobic chambers of the reactor, an anaerobic environment will be maintained, and the biomass will continue to be efficiently torrefied.

After subjecting the biomass of the fourth anaerobic chamber to the temperatures disclosed above, the biomass from the fourth anaerobic chamber (149) can be transferred to an anaerobic cool down compartment (151) by the transfer process described above and by opening the biomass valve (115) (FIG. 4) that separates the fourth anaerobic chamber from the cool down compartment. In certain aspects, the biomass from the fourth anaerobic chamber is a torrefied material, and in certain aspects, the anaerobic cool down compartment can be a chamber as described above or a separate compartment capable of containing and cooling the torrefied material. Upon transferring the torrefied material to the cool down compartment, the torrefied material is cooled to below the auto ignition temperature. In certain aspects, the torrefied material remains in the cooling compartment long enough to allow the core of the torrefied material to cool. Because torrefied material has very poor internal heat transfer property, it is necessary to allow sufficient time for the center core of the torrefied material to cool or else spontaneous ignition could occur even several days after removal from the chamber.

In certain aspects, the torrefied material made with the reactors and method described above has the following properties: (1) a caloric value equivalent to various grades of commercially available coal (e.g., a caloric value from about 8,500 BTU/lb to about 11,500 BTU/lb), (2) a significant retention of lignin content, and (3) the torrefied material is hydrophobic and capable of being stored outdoors with little or no moisture absorption.

In certain aspects, the torrefied material/biomass is controllably cooled and discharged from the cooling compartment. After cooling and discharging the torrefied material, the torrefied material can be further subjected to a densification process in which the torrefied material is placed into conventional densification equipment and subjected a densification process to form briquettes or pellets. This densification process further aids to increase the density of the torrefied material and to improve the torrefied material's hydrophobic properties. In certain aspects, the torrefied material/biomass is densified without the use of a synthetic binder. In this aspect, the lignin in holds and/or binds the densified material together thus obviating the need for a synthetic binder. When lignin holds the densified material together, the biomass is preferably densified before lignin in the torrefied biomass goes through its glass transition point and/or state.

In certain aspects, the conditions occurring in second anaerobic chamber, the third anaerobic chamber, and fourth anaerobic chamber can be altered as desired. For example, the second anaerobic chamber can have the environmental conditions of the above described third or fourth chambers. For example, the third chamber can have the environmental conditions of the above described second chamber or fourth chamber. For example, the fourth chamber can have the environmental conditions of the above described second chamber or third chamber.

| Numeral | Element |
| --- | --- |
| 10 | Related Art Dryer |
| 12 | Trays |
| 13 | Rims |
| 14 | Biomass Inlet |
| 16 | Biomass Outlet |
| 24 | vapor inlets |
| 25 | turbofans |
| 26 | vapor outlet |
| 31 | outer shell |
| 32 | center shaft |
| 34 | height adjusters |
| 36 | sweepers |
| 38 | slot |
| 100 | Reactor |
| 101 | Chamber |
| 108 | biomass movement |
| 112 | trays |
| 113 | rims |
| 114 | biomass in |
| 115 | Separator (e.g., biomass valve) |
| 116 | biomass out |
| 118 | tray rotation |
| 124 | vapor in |
| 125 | vapor flow |
| 126 | vapor out |
| 127 | vapor control |
| 128 | burner |
| 129 | pump |
| 130 | valve |
| 131 | outer shell |
| 132 | center shaft |
| 134 | height adjusters |
| 136 | sweepers |
| 138 | slot |
| 139 | Environmental Control Unit |
| 141 | Aerobic chamber |
| 143 | First Anaerobic Chamber |
| 145 | Second Anaerobic Chamber |
| 147 | Third Anaerobic Chamber |
| 149 | Fourth Anaerobic Chamber |
| 151 | Cool Down Compartment |
| 157 | Leading Plow |
| 158 | Lagging Plow |

What is claimed is:

1. A method of distilling biomass in a reactor, the reactor having a plurality of chambers, in which temperature, internal vapor pressure, vapor composition and vapor flow can be independently controlled in each chamber, the method comprising:
introducing biomass into at least a first chamber of the plurality of chambers of the reactor; and
transferring the biomass from the first chamber to a second chamber of the plurality of chambers,
wherein a chamber separator is disposed between the first chamber and the second chamber of the plurality of chambers, wherein the chamber separator has an open and closed position, and wherein the closed position separates the first chamber from the second chamber.

2. The method of claim 1, wherein the biomass is cellulosic material.

3. The method of claim 2, wherein the cellulosic material is wood.

4. The method of claim 2, wherein the cellulosic material is grass.

5. The method of claim 1, further comprising creating an anaerobic environment in at least one chamber and heating the biomass in the anaerobic environment at a temperature and pressure sufficient to remove lower molecular weight volatile organic compounds from the biomass, the anaerobic environment being unsuitable for exothermic decomposition.

6. The method of claim 5, further comprising removing the lower molecular weight volatile organic compounds from the chamber via at least one vapor outlet and recovering the lower molecular weight volatile organic compounds.

7. The method of claim 1, comprising transferring the biomass to at least one anaerobic chamber, and
heating the biomass in an anaerobic environment having a temperature and pressure sufficient to induce at least one of hemi-cellulose decomposition and cellulose decomposition in the biomass.

8. The method of claim 1, comprising heating the biomass in a chamber having an aerobic environment to reduce moisture content of the biomass to 5% or lower while minimizing burning off lower molecular weight volatile organic compounds; and
transferring the biomass from the chamber having an aerobic environment to an anaerobic chamber.

9. The method of claim 1, further comprising the steps of transferring the biomass from the reactor into a cooling compartment, the cooling compartment having an anaerobic environment; and
cooling the entire biomass in the cooling compartment to a predetermined discharge temperature that is below an ignition temperature of the biomass.

10. A reactor for distillation of biomass comprising:
a plurality of environmental control units;
a plurality of chambers arranged vertically along a vertical axis, wherein each is independently connected to at least one environmental control unit and each chamber is capable of having an independently controlled internal environment; and
wherein a chamber separator is disposed between a first chamber and a second chamber of the plurality of chambers, wherein the chamber separator has an open and closed position, and wherein the closed position separates the first chamber the second chamber.

11. The reactor according to claim 10, wherein the reactor comprises at least two interconnected chambers along a vertical axis.

12. The reactor according to claim 10, wherein the reactor comprises at least five interconnected chambers along a vertical axis.

13. The reactor according to claim 12, wherein the first chamber is an aerobic chamber, the second chamber is a first anaerobic chamber, the third chamber is a second anaerobic chamber, the fourth chamber is a third anaerobic chamber, and the fifth chamber is a fourth anaerobic chamber.

14. The reactor according to claim 13, further comprising at least one cool down compartment connected to the fourth anaerobic chamber and configured to receive biomass from the fourth anaerobic chamber and to allow for the biomass to cool down to a predetermined discharge temperature below an ignition temperature of the biomass.

15. The reactor according to claim 10, wherein each chamber further comprises a plurality of trays, wherein each tray is independently rotatable or independently non-rotatable about the vertical axis and is configured to move biomass from an upper tray towards an opening in the tray or an edge of the tray so that the biomass falls from the upper tray to either a lower tray or to the chamber separator.

16. The reactor according to claim 15, wherein each chamber further comprises a plurality of sweepers, each sweeper is independently rotatable, independently non-rotatable, independently capable of an actuating movement, or any combination thereof to move the biomass located on an upper tray towards an opening in the tray or an edge of the tray so that the biomass falls from the upper tray to either the lower tray or the chamber separator.

17. The reactor according to claim 10, wherein the first chamber is configured to reduce or inhibit vapor transfer from a first chamber to a second chamber by maintaining a lower vapor pressure in the first chamber relative to a vapor pressure of the second chamber.

18. The reactor according to claim 15, wherein at least one vapor inlet and at least one vapor outlet are arranged to produce a cyclonic vapor flow about the vertical axis of the chamber in either a co-current or counter-current fashion relative to transfer of biomass.

* * * * *